United States Patent
Kohls

(10) Patent No.: US 7,970,511 B2
(45) Date of Patent: Jun. 28, 2011

(54) ELECTRONIC STEERING DAMPER SYSTEMS AND VEHICLES INCLUDING SAME

(75) Inventor: Mark T. Kohls, Marysville, OH (US)

(73) Assignee: Honda Motor Company, Ltd., Tokyo (JP)

( * ) Notice: Subject to any disclaimer, the term of this patent is extended or adjusted under 35 U.S.C. 154(b) by 588 days.

(21) Appl. No.: 12/026,888

(22) Filed: Feb. 6, 2008

(65) Prior Publication Data
US 2009/0198411 A1   Aug. 6, 2009

(51) Int. Cl.
*B62K 21/08* (2006.01)

(52) U.S. Cl. .......... 701/36; 188/290; 280/267; 280/272; 74/484 R; 74/483 PB; 74/488

(58) Field of Classification Search .............. 701/36, 701/37; 280/5.5, 272, 267; 180/280; 74/483 PB, 74/484 R; 188/290, 310; *B62K 21/08*
See application file for complete search history.

(56) References Cited

U.S. PATENT DOCUMENTS

| | | | |
|---|---|---|---|
| 4,522,279 A | 6/1985 | Kanazawa | |
| 4,624,335 A | 11/1986 | Shiraishi et al. | |
| 4,773,514 A | 9/1988 | Gustafsson | |
| 4,811,807 A | 3/1989 | Schier | |
| 4,925,198 A | 5/1990 | Ito et al. | |
| 5,076,383 A | 12/1991 | Inoue et al. | |
| 5,492,033 A | 2/1996 | Hopey | |
| 5,927,740 A * | 7/1999 | Hopey | 280/272 |
| 6,138,596 A | 10/2000 | Gonring et al. | |
| 6,390,255 B2 * | 5/2002 | Kobori et al. | 188/290 |
| 6,401,884 B2 * | 6/2002 | Norman et al. | 188/310 |
| 6,471,229 B2 * | 10/2002 | Stewart | 280/272 |
| 6,547,043 B2 | 4/2003 | Card | |
| 6,708,795 B2 | 3/2004 | Hasegawa et al. | |
| 6,726,232 B2 | 4/2004 | Hasegawa et al. | |
| 6,769,707 B2 | 8/2004 | Hasegawa et al. | |
| 6,779,625 B2 | 8/2004 | Sonoda et al. | |
| 6,802,519 B2 | 10/2004 | Morgan et al. | |
| 6,817,265 B2 | 11/2004 | Hasegawa et al. | |
| 6,820,714 B2 | 11/2004 | Schymczyk et al. | |
| 6,824,153 B2 | 11/2004 | Hanawa et al. | |
| 6,848,698 B2 | 2/2005 | Hasegawa et al. | |
| 7,278,660 B2 * | 10/2007 | Ridgeway et al. | 280/775 |
| 7,321,311 B2 * | 1/2008 | Rieth et al. | 340/576 |
| 7,594,563 B2 * | 9/2009 | Lutz | 180/402 |
| 7,726,677 B2 * | 6/2010 | Fujita | 280/272 |
| 2002/0152832 A1 * | 10/2002 | Hasegawa et al. | 74/551.8 |

(Continued)

OTHER PUBLICATIONS

Takeshi Wakabayashi, Shinichi Yamada, Kiyotaka Sakai and Takehiko Nanri, Development of Electronically Controlled Hydraulic Steering Damper for Motorcycles, Honda R&D Technical Review, Apr. 2004, pp. 55-61, vol. 16 No. 1.

(Continued)

*Primary Examiner* — Tuan C To
(74) *Attorney, Agent, or Firm* — Ulmer & Berne LLP

(57) ABSTRACT

An electronic steering damper system is provided for a vehicle. The electronic steering damper system can be supported with respect to the vehicle's frame and can selectively impose resistance to steering of one or more of the vehicle's wheels in response to a vehicle condition signal received from a sensor such as, for example, a vehicle speed sensor. An actuator connected with the electronic steering damper system can be configured for use by an operator to adjust the manner in which the electronic steering damper system selectively imposes resistance to steering of the wheel(s) in response to the vehicle condition signal. Vehicles including an electronic steering damper system are also provided.

17 Claims, 7 Drawing Sheets

U.S. PATENT DOCUMENTS

| | | | |
|---|---|---|---|
| 2002/0157909 A1* | 10/2002 | Hasegawa et al. | 188/290 |
| 2003/0047903 A1* | 3/2003 | Hasegawa et al. | 280/272 |
| 2003/0127824 A1* | 7/2003 | Hasegawa et al. | 280/272 |
| 2004/0200680 A1 | 10/2004 | Yamada et al. | |
| 2004/0211632 A1* | 10/2004 | Yamada | 188/290 |
| 2004/0216452 A1 | 11/2004 | Nakagome | |
| 2004/0239069 A1* | 12/2004 | Yamada et al. | 280/272 |
| 2005/0087969 A1 | 4/2005 | Okazaki et al. | |
| 2005/0151341 A1 | 7/2005 | Iwamoto et al. | |
| 2005/0173911 A1 | 8/2005 | Takeuchi et al. | |
| 2006/0220340 A1* | 10/2006 | Seki et al. | 280/272 |
| 2007/0216124 A1* | 9/2007 | Wakabayashi et al. | 280/89 |

OTHER PUBLICATIONS http://world.honda.com/motorcycle-technology/hesd/p1.html, Honda Worldwide-Technology Close-Up, HESD (Honda Electronic Steering Damper), 2 pages, Retrieved Nov. 27, 2006.

http://world.honda.com/motorcycle-technology/hesd/p2.html, Honda Worldwide-Technology Close-Up, A Steering Damper that Constantly Offers Optimum Damping Force, 2 pages, Retrieved Nov. 27, 2006.

http://world.honda.com/motorcycle-technology/hesd/p3.html, Honda Worldwide-Technology Close-Up, The Steering Stability Demands of the MotoGP Machine, 2 pages, Retrieved Nov. 27, 2006.

http://world.honda.com/motorcycle-technology/hesd/p4.html, Honda Worldwide-Technology Close-Up, Assessment and Analysis by Actual Test Run, 2 pages, Retrieved Nov. 27, 2006.

http://world.honda.com/motorcycle-technology/hesd/p5.html, Honda Worldwide-Technology Close-Up, System and Damper Configuration, 3 pages, Retrieved Nov. 27, 2006.

* cited by examiner

ELECTRONIC STEERING DAMPER SYSTEMS AND VEHICLES INCLUDING SAME

TECHNICAL FIELD

An electronic steering damper can selectively apply a dampening force to a steering interface in response to a vehicle condition.

BACKGROUND

Certain terrain conditions can cause rapid, unanticipated movement of the handlebars of a saddle-type vehicle. Steering dampers are conventionally provided to dampen such movement, and thus reduce likelihood of injury to an operator resulting from such movement of the handlebars.

SUMMARY

In accordance with one embodiment, a saddle-type vehicle comprises a frame, a vehicle condition sensor, at least one wheel, a steering interface, an electronic steering damper system, and an actuator. The vehicle condition sensor is supported with respect to the frame and is configured to generate a vehicle condition signal. The wheel(s) is/are supported with respect to the frame and is/are configured for contacting the ground during travel of the saddle-type vehicle. A steering interface comprising a handlebar is supported with respect to the frame. The handlebar is operably coupled with the wheel(s) and is configured to facilitate steering of the wheel(s) by an operator. The electronic steering damper system is supported with respect to the frame and comprises a memory device configured to store multiple respective preset dampening maps. The actuator comprises an electrical switch connected to the electronic steering damper system. The actuator is configured for use by an operator to select from among the preset dampening maps. The electronic steering damper system is configured to selectively impose resistance to steering of the wheel(s) in accordance with a selected one of the preset dampening maps and in real time response to the vehicle condition signal.

In accordance with another embodiment, a vehicle comprises a frame, a vehicle condition sensor, at least one wheel, a steering interface, an electronic steering damper system, and an actuator. The vehicle condition sensor is supported with respect to the frame and is configured to generate a vehicle condition signal. The wheel(s) is/are supported with respect to the frame and is/are configured for contacting the ground during travel of the vehicle. The steering interface is supported with respect to the frame. The steering interface is operably coupled with the wheel(s) and is/are configured to facilitate steering of the wheel(s) by an operator. The electronic steering damper system is supported with respect to the frame and is configured to selectively impose resistance to steering of the wheel(s) in response to the vehicle condition signal. The actuator is connected with the electronic steering damper system and is configured for use by an operator to adjust the manner in which the electronic steering damper system selectively imposes resistance to steering of the wheel(s) in response to the vehicle condition signal.

In accordance with yet another embodiment, an electronic steering damper system for a vehicle is provided. The electronic steering damper system comprises a conduit, a solenoid valve, a first input, a second input, and a controller. The conduit is configured for passage of fluid. The solenoid valve is associated with the conduit and is configured to selectively regulate flow within the conduit in response to a control signal. The first input is configured to receive a speed signal from a speed sensor. The second input is configured to receive an actuator signal from an actuator. The controller is connected with the solenoid valve, the first input, and the second input. The controller is configured to generate the control signal in response to the speed signal and the actuator signal.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Figure 1:
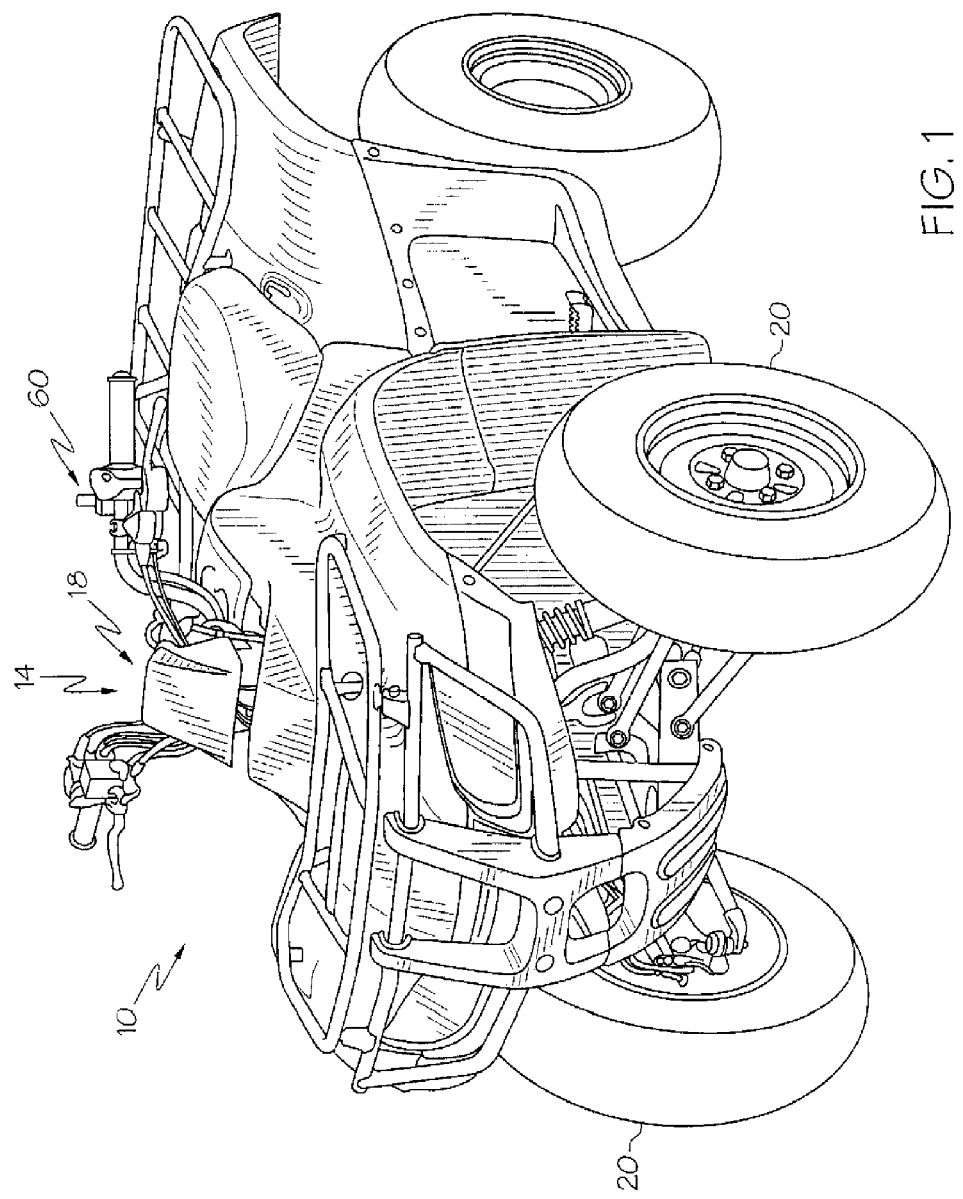
FIG. 1 is a front perspective view depicting an all terrain vehicle ("ATV") in accordance with one embodiment.

The present invention and its operation are hereinafter described in detail in connection with the views and examples of FIGS. 1-7. A vehicle can include a steering interface to facilitate steering of the vehicle by an operator. In one embodiment, the vehicle can comprise an ATV 10, as shown in FIG. 1, for example. However, in alternative embodiments, the vehicle can comprise another variety of saddle-type vehicle (e.g., a bicycle, a motorcycle, a personal watercraft (PWC), a scooter, or a snowmobile) or any of a variety of other type of vehicle.

Figure 2:
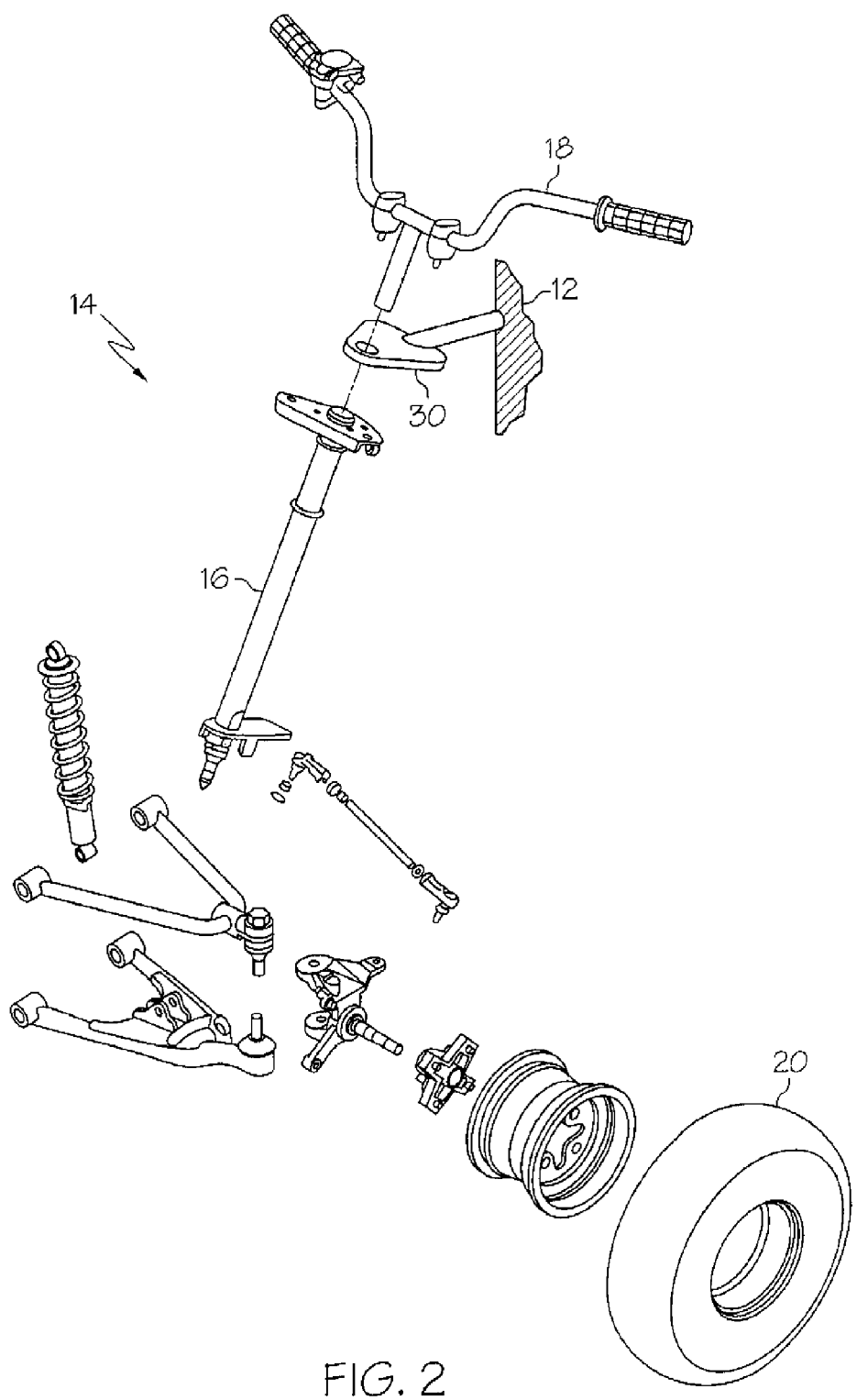
FIG. 2 is an exploded perspective view generally depicting certain components of the ATV of FIG. 1 apart from the remaining components of the ATV of FIG. 1, which have been removed for clarity of illustration.

The ATV 10 is shown in FIGS. 1-2 to include a steering interface 14 comprising a handlebar 18 and a steering shaft 16. As will be appreciated from FIG. 2, the handlebar 18 can be connected to the steering shaft 16, and the steering shaft 16 can be connected to front wheels 20 of the ATV 10 through any of a variety of suitable linkages (e.g., an example of which is generally depicted in FIG. 2). The steering shaft 16 may be pivotally supported with respect to a frame 12 of the ATV 10 such that an operator may turn the handlebar 18 to effect pivoting of the steering shaft 16 and resultant steering of the front wheels 20. Although the ATV 10 is shown in FIG. 1 to comprise two front wheels 20 which are each steerable by the steering interface 14, it will be appreciated that a vehicle may alternatively comprise a different quantity of steerable wheels and/or steerable wheels located in other locations upon a vehicle and which are connected with a steering interface.

A vehicle can additionally include an electronic steering damper system. The electronic steering damper system can be supported with respect to the vehicle's frame, and can also be attached to the vehicle's steering interface. As will be described in more detail below, the electronic steering damper system may be configured to selectively apply a dampening force to the steering interface. In this manner, the electronic steering damper system can selectively impose resistance to steering of the vehicle's wheels. Certain conventional electronic steering damper systems are described in U.S. Patent Application Publication Nos. 2004/0239069, 2004/0200680, and 2004/0211632, each of which are hereby incorporated herein by reference.

Figure 3:
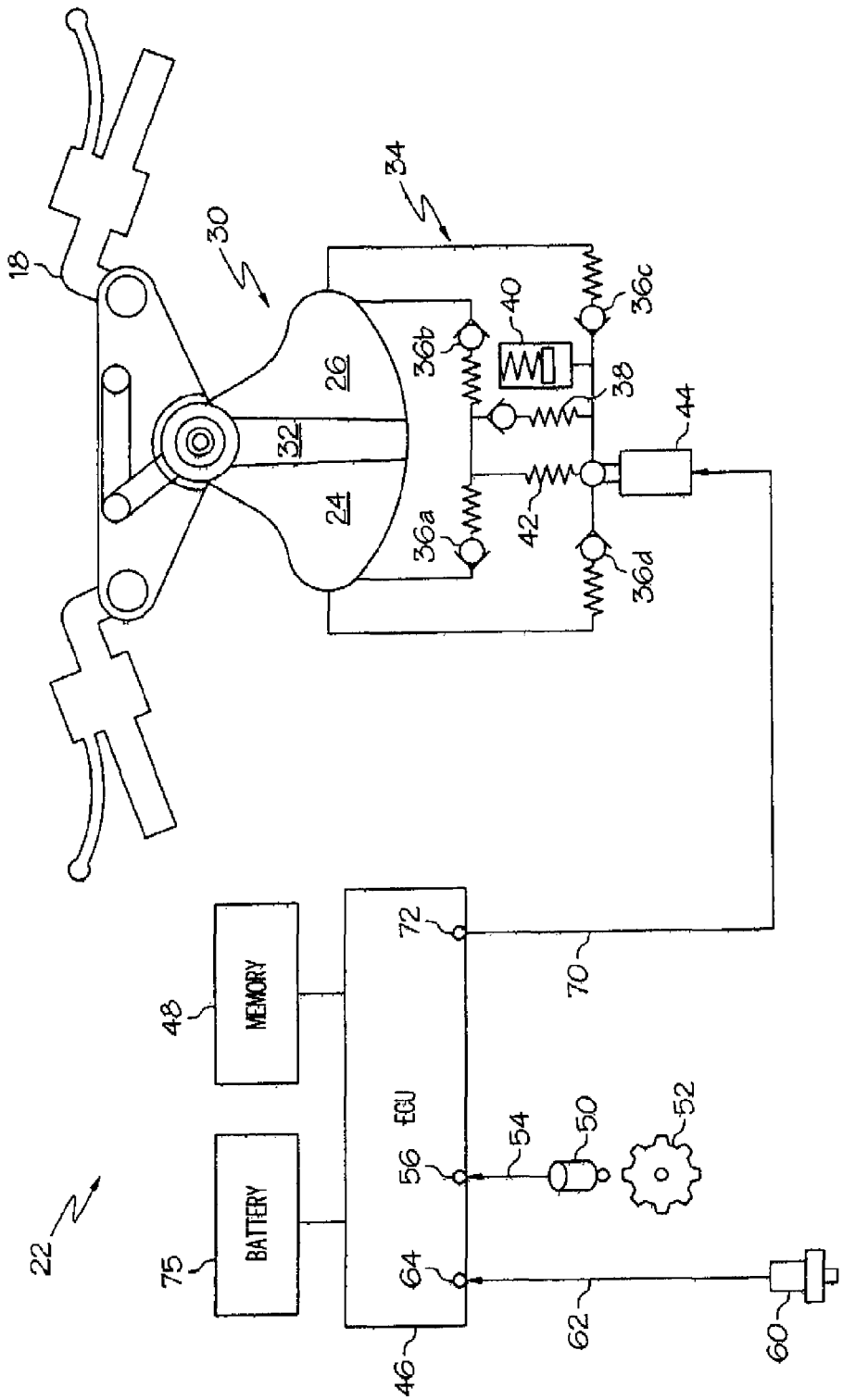
FIG. 3 is a schematic view depicting an electronic steering damper system in association with a handlebar and other components of the ATV of FIG. 1, wherein the handlebar is shown to be in a central position.
Figure 4:
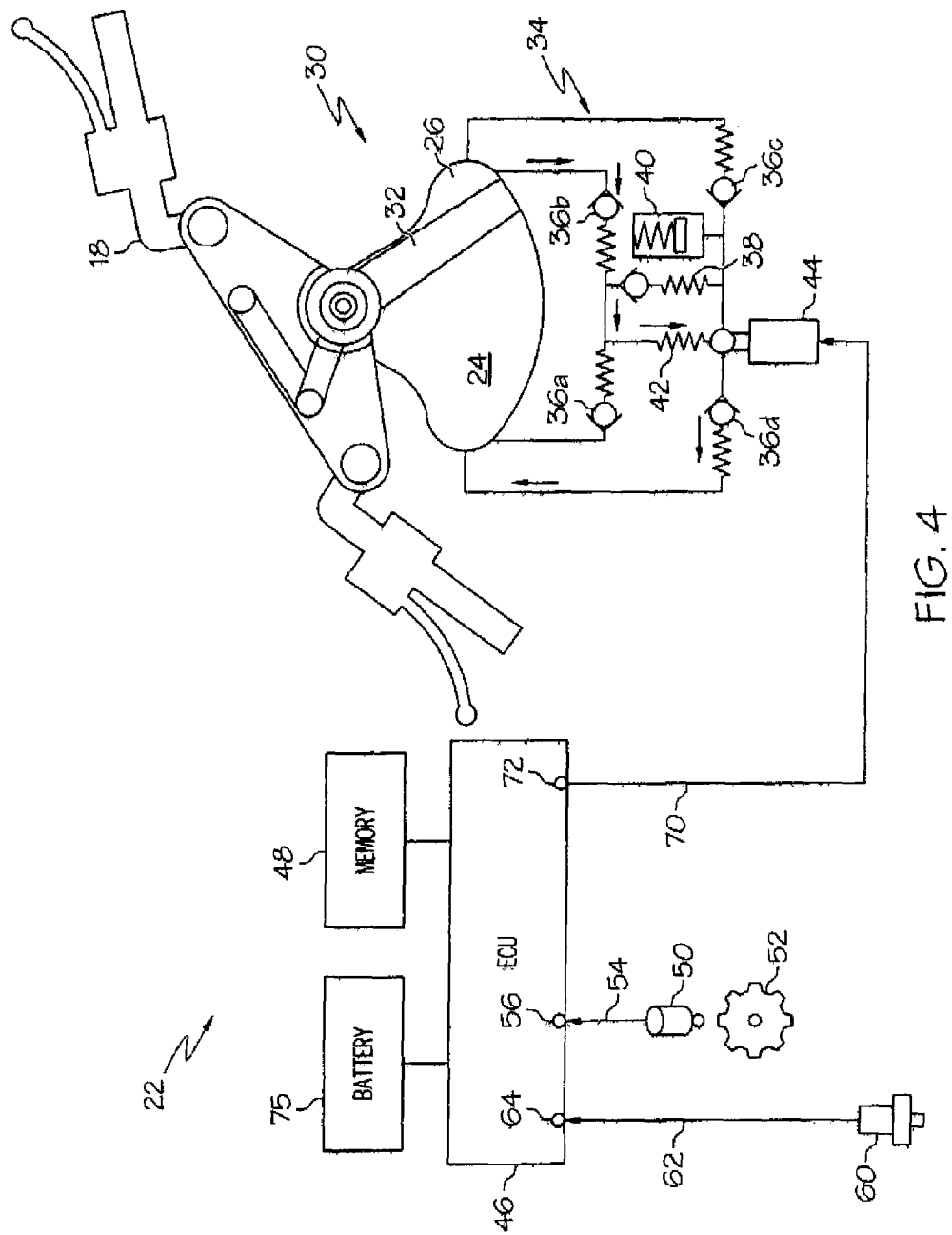
FIG. 4 is a schematic view depicting the components of FIG. 3, wherein the handlebar is shown to be pivoted to a leftward position.
Figure 5:
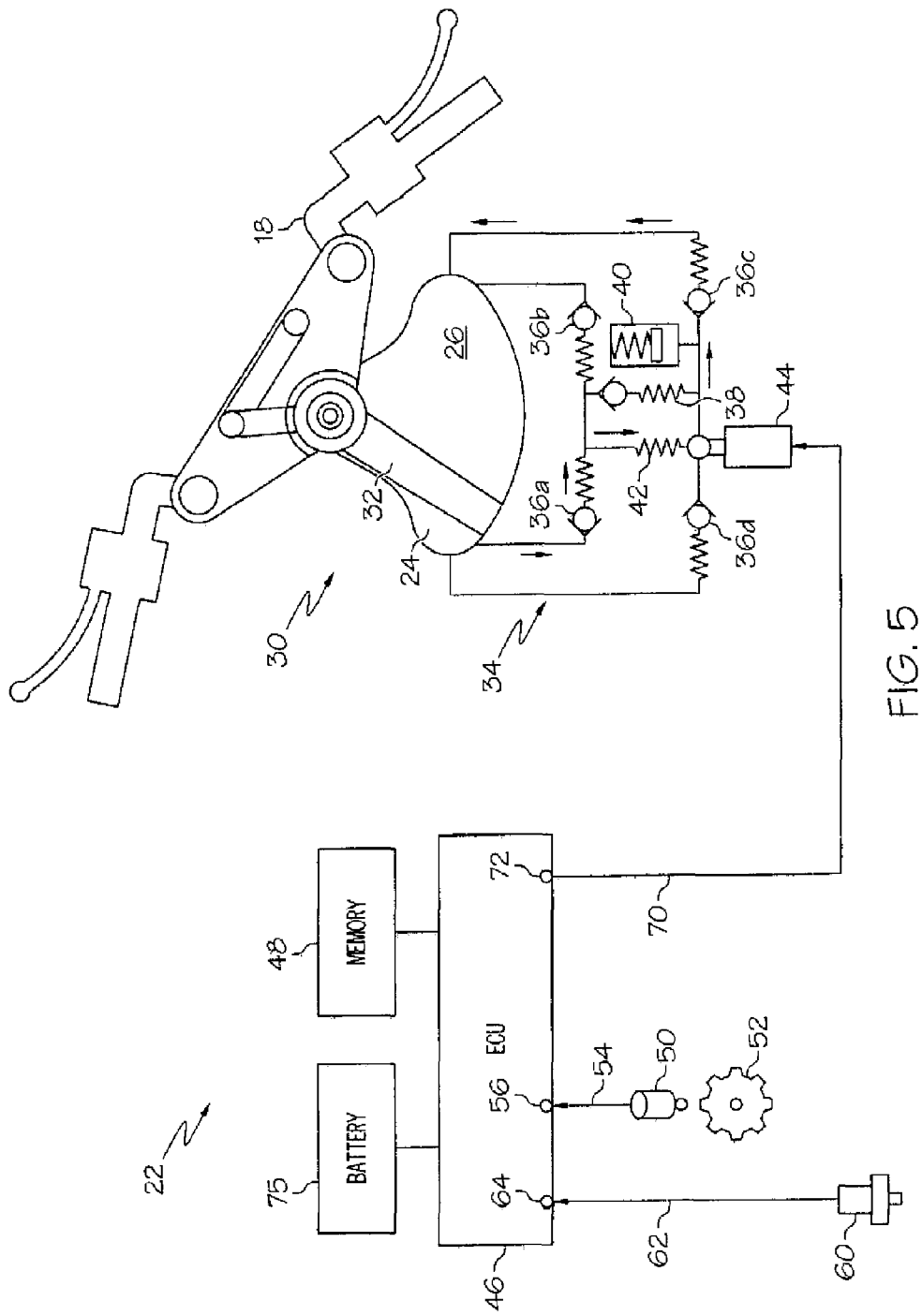
FIG. 5 is a schematic view depicting the components of FIG. 3, wherein the handlebar is shown to be pivoted to a rightward position.

The electronic steering damper system can include any of a variety of mechanical damper arrangements. For example, as shown in FIGS. 2-5, an electronic steering damper system 22 is shown in FIGS. 3-5 to comprise a rotary steering damper 30. The rotary steering damper 30 is shown to include a vane 32 which can be attached to the handlebar 18 or another portion of the steering interface 14. At least a portion of the vane 32 may be disposed within an inner area defined by the rotary steering damper 30 such that a first chamber 24 and a second chamber 26 are respectively defined upon opposite sides of the vane 32. Movement of the handlebar 18 can result in corresponding movement of the vane 32 within the inner area of the rotary steering damper 30, and can accordingly result in altering the volume(s) of the first and second chambers 24, 26. As will be described in further detail below, by dampening movement of the vane 32, the electronic steering damper system 22 can dampen movement of the steering interface 14.

Figure 6:
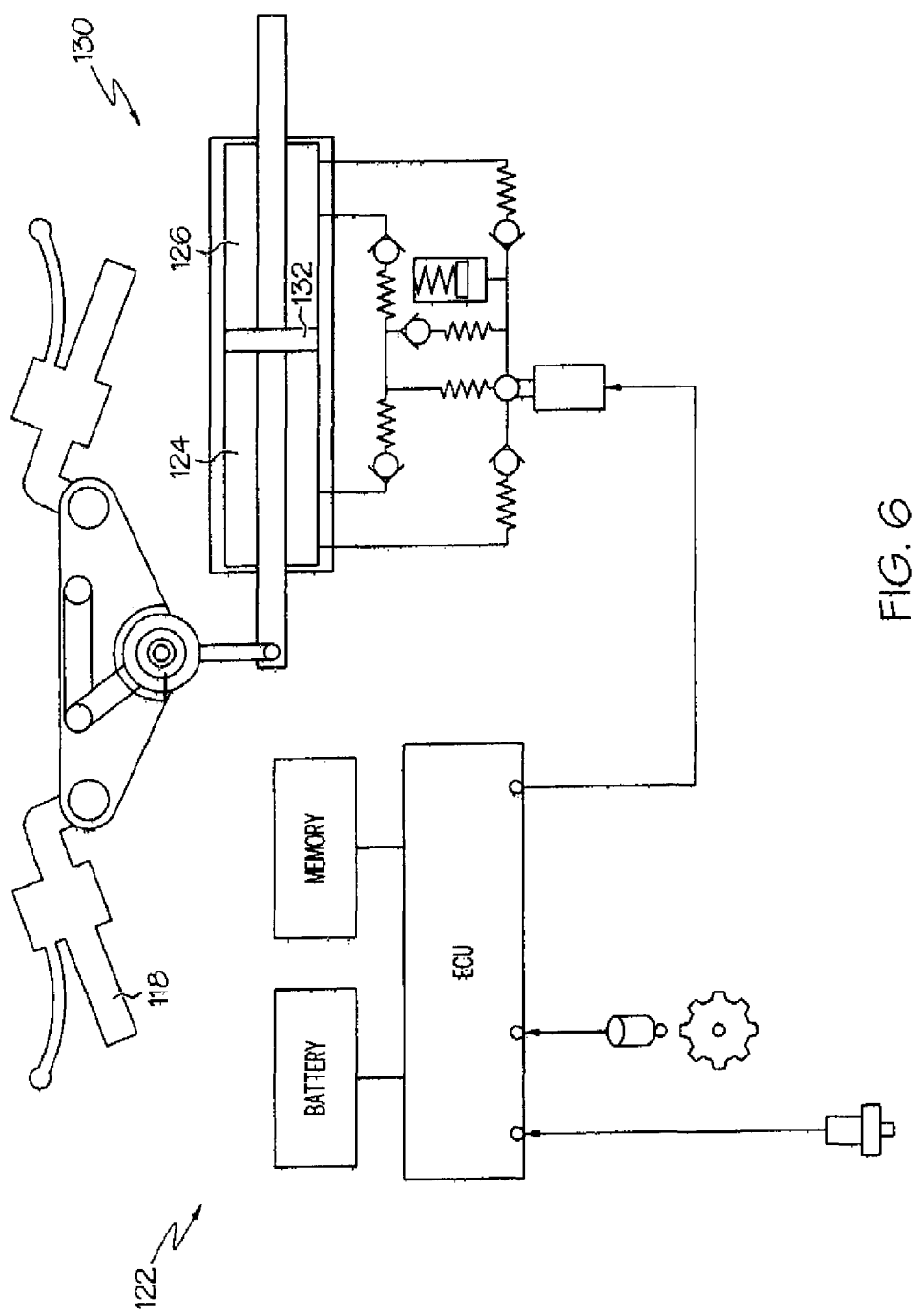
FIG. 6 is a schematic view depicting an electronic steering damper system in association with a handlebar and other components of an ATV in accordance with another embodiment.

In an alternative embodiment, instead of the rotary steering damper 30 described above with respect to FIGS. 3-5, an electronic steering damper system 122 can comprise a linear steering damper 130 as shown in FIG. 6. The linear steering damper 130 can include a piston 132 which is attached to the handlebar 118. At least a portion of the piston 132 can be disposed within an inner area defined by the linear steering damper 130 such that a first chamber 124 and a second chamber 126 are respectively defined within the linear steering damper 130 and upon opposite sides of the piston 132. Movement of the handlebar 118 may correspondingly move the piston 132 within the inner area and change the volume(s) of the first and second chambers 124, 126. Similar to the vane 32 described above with respect to FIGS. 3-5, dampening movement of the piston 132 may correspondingly dampen movement of the handlebar 118 and other components of an associated steering interface.

Referring again to FIGS. 3-5, fluid may be provided within the first and second chambers 24, 26 to facilitate dampening of the steering interface 14. In one embodiment, the fluid may comprise a viscous fluid (e.g., hydraulic oil). In another embodiment, the fluid may comprise a compressible gas (e.g., nitrogen). It will be appreciated that any of a variety of fluids may be provided within an electronic steering damper system to facilitate dampening of a steering interface.

The electronic steering damper system 22 can include a fluid circuit 34. As shown in FIGS. 3-5, the fluid circuit 34 can include one or more conduits which can facilitate passage of fluid between the first and second chambers 24, 26 of the electronic steering damper system 22. During movement of the steering interface 14, fluid can be communicated through the conduit(s) of the fluid circuit 34, and between the first and second chambers 24, 26.

In one embodiment, as shown in FIGS. 3-5, the fluid circuit 34 may comprise check valves 36a, 36b, 36c, and 36d which may be operable to selectively open and close in accordance with a desired direction of fluid flow, and to thereby facilitate fluid flow in one direction while preventing fluid flow in an opposite direction. In particular, the check valves 36a, 36b, 36c, and 36d may be arranged to facilitate the flow of fluid through the fluid circuit 34 such that fluid may flow through the fluid circuit 34 along one or more predefined paths during movement of the steering interface 14.

For example, as illustrated in FIG. 4, when the handlebar 18 is pivoted leftward (e.g., to steer ATV 10 in a leftward direction), the vane 32 may move towards the right within the inner area defined by the rotary steering damper 30. Fluid may accordingly be displaced from the second chamber 26 and into the fluid circuit 34. The fluid flow may urge check valve(s) 36b and 36d into "open" positions and correspondingly urge check valve(s) 36a and 36c into "closed" positions. In this arrangement, fluid can flow from the second chamber 26, through the check valve 36b, though the check valve 36d, and into the first chamber 24.

When the handlebar 18 is pivoted rightward (e.g., to steer ATV 10 in a rightward direction), as shown in FIG. 5, the vane 32 may move towards the left within the inner area defined by the rotary steering damper 30. Fluid may accordingly be displaced from the first chamber 24 and into the fluid circuit 34. The fluid flow may urge check valve(s) 36a and 36c into "open" positions and correspondingly urge check valve(s) 36b and 36d into "closed" positions. In this arrangement, the fluid may flow from the first chamber 24, through the check valve 36a, though the check valve 36c, and into the second chamber 26.

The fluid circuit 34 may additionally comprise a relief valve 38. The relief valve 38 can be selected such that its operating characteristics prevent the fluid circuit 34 from excessively restricting the flow of fluid between the first and second chambers 24, 26. In this manner, the relief valve 38 can facilitate variation in the maximum dampening force applied to the steering interface 14 by the electronic steering damper system 22. The fluid circuit 34 may additionally or alternatively comprise an accumulator 40. The accumulator 40 can stabilize the pressure of the fluid within the fluid circuit 34, such as during changes in temperature. It will be appreciated that a fluid circuit can include a relief valve and/or an accumulator in any of a variety of alternative arrangements, and that a fluid circuit can have any of a variety of suitable alternative configurations or arrangements for facilitating fluid flow between respective chambers of an electronic steering damper system.

The fluid circuit can also be provided with a valve 42 configured to selectively and variably restrict the amount of fluid which can flow through the fluid circuit 34 and between the first and second chambers 24, 26. In particular, the valve 42 can be associated with one or more conduits of the fluid circuit 34 to selectively and variably restrict the amount of fluid which can flow through the conduit, and thus resultantly, through the fluid circuit 34. In one embodiment, the valve 42 can comprise a solenoid valve such as might include a linear-type solenoid 44, as shown in FIGS. 3-5, for example. However, it will be appreciated that such a valve might additionally or alternatively comprise a motor or some other type of actuator.

Restriction by the valve 42 of fluid flow within one or more conduits of the fluid circuit 34 can result in application by the electronic steering damper system 22 of increased dampening force to the steering interface 14. For example, the steering interface 14 may move freely (i.e., undampened) so long as the fluid displaced by the movement of the vane 32 flows freely through the fluid circuit 34. However, once movement of the steering interface 14 displaces fluid more quickly than the fluid can flow through the fluid circuit 34, the electronic steering damper system 22 can impose a dampening force upon the steering interface 14.

Accordingly, in order to effect variation of dampening force applied upon the steering interface 14 by the electronic steering damper system 22, fluid flow within a conduit of the electronic steering damper system 22 can be varied by the valve 42. In one embodiment, the valve 42 may comprise a variable plunger (not shown) that may selectively restrict fluid flow within the fluid circuit 34 and thereby selectively dampen movement of the steering interface 14. For example, when minimal dampening force is desired, a plunger of the valve 42 may be completely withdrawn from a conduit of the fluid circuit 34 to facilitate increased flow of fluid through the conduit. However, when increased dampening force is desired, the plunger of the valve 42 may increasingly obstruct the conduit of the fluid circuit 34 to increase restriction of fluid flow through the conduit.

When operating the ATV 10 at low speeds, an operator may appreciate having an ability to rapidly and effortlessly rotate the handlebar 18 to facilitate steering of the ATV 10 around closely-spaced terrain obstacles. However, at higher speeds of the ATV 10, the operator may instead desire dampened movement of the handlebar 14 such that terrain obstacles encountered at high speeds do not result in significant kickback to the operator. It can therefore be desirable for the electronic steering damper system 22 to apply varying dampening forces to the steering interface 14 depending upon operating conditions (e.g., ground speed) of the ATV 10.

The electronic steering damper system 22 can facilitate such variable dampening. In particular, as illustrated in FIGS. 3-5, an output 72 of an electronic control unit ("ECU") 46 may be connected with the linear-type solenoid 44 (e.g., through control signal path 70). In such an embodiment, the ECU 46 may generate a control signal to facilitate variation of the position of a plunger of the valve 42, and to thereby change the restriction of fluid flowing through a conduit of the fluid circuit 34. As described below, the ECU 46 can generate this control signal in response to detected vehicle conditions and in further response to an operator's settings or preferences. The ECU 46 can receive power from any of a variety of power sources which might be present upon the ATV 10. For example, as shown in FIGS. 3-5, the ECU 46 might be configured to receive power from a battery 75 present upon the ATV 10.

The ECU 46 can generate the control signal in response to any of a variety of vehicle conditions. Such vehicle conditions can be detected through use of one or more sensors disposed within the ECU 46 and/or at any of a variety of positions upon the ATV 10. In one embodiment, as illustrated in FIGS. 3-5, the ECU 46 can include an input 56 which is configured to receive a speed signal (e.g., via electrical conductor 54) from a speed sensor 50. The speed sensor 50 can be configured to monitor the speed of a sprocket (e.g., 52) or other device which is attached to an engine or wheel of the ATV 10. In an alternative embodiment, the speed sensor 50 can be configured to detect the rotation speed of another portion of the ATV 10 such as, for example, the steering shaft 16 of the steering interface 14. A ground speed signal might alternatively be provided to an ECU by a global positioning system or other speed-sensing arrangement. In other embodiments, the ECU 46 can additionally or alternatively receive other types of vehicle condition signals such as from accelerometers or other sensors provided upon the ATV 10. In the example of FIGS. 3-5, it will be appreciated that the ECU 46 can monitor the engine speed or ground speed of the ATV 10, and can facilitate variation in operation of the valve 42 in response to the detected speed, thereby effecting variation in dampening of the steering interface 14 provided by the electronic steering damper system 22. It will be appreciated that a vehicle condition sensor can communicate with an ECU in any of a variety of manners such as may involve wires or wireless components.

The electronic steering damper system 22 can also variably adjust dampening of a steering interface 14 in response to an operator's preferences or settings. One or more actuators can be provided to facilitate an operator's indication of such preferences or settings. For example, as shown in FIGS. 3-5, the ECU 46 can be provided with an input 64 which is configured to receive signals (e.g., via electrical conductor 62) from an actuator 60 which can comprise a pushbutton, rocker switch, toggle switch, rotary switch, or other type of electrical switch or other device. It will be appreciated that an actuator can communicate wirelessly with an ECU, or in some alternative arrangement.

The actuator 60 can be positioned at any of a variety of locations upon the ATV 10. In one embodiment, as shown in FIG. 1, the actuator 60 can be attached to the handlebar 18 (e.g., adjacent to a left handgrip) to facilitate convenient access to the actuator 60 by one of an operator's hands (e.g., a left hand) during movement of the ATV 10. It will be appreciated that an actuator might alternatively be mounted on a foot support for easy actuation by an operator's foot, or in any of a variety of other suitable locations. Through use of the actuator 60, an operator can communicate his or her preferences to the ECU 46. The ECU 46 can, in response, affect the manner in which it controls the valve 42 in response to vehicle condition signals.

Figure 7:
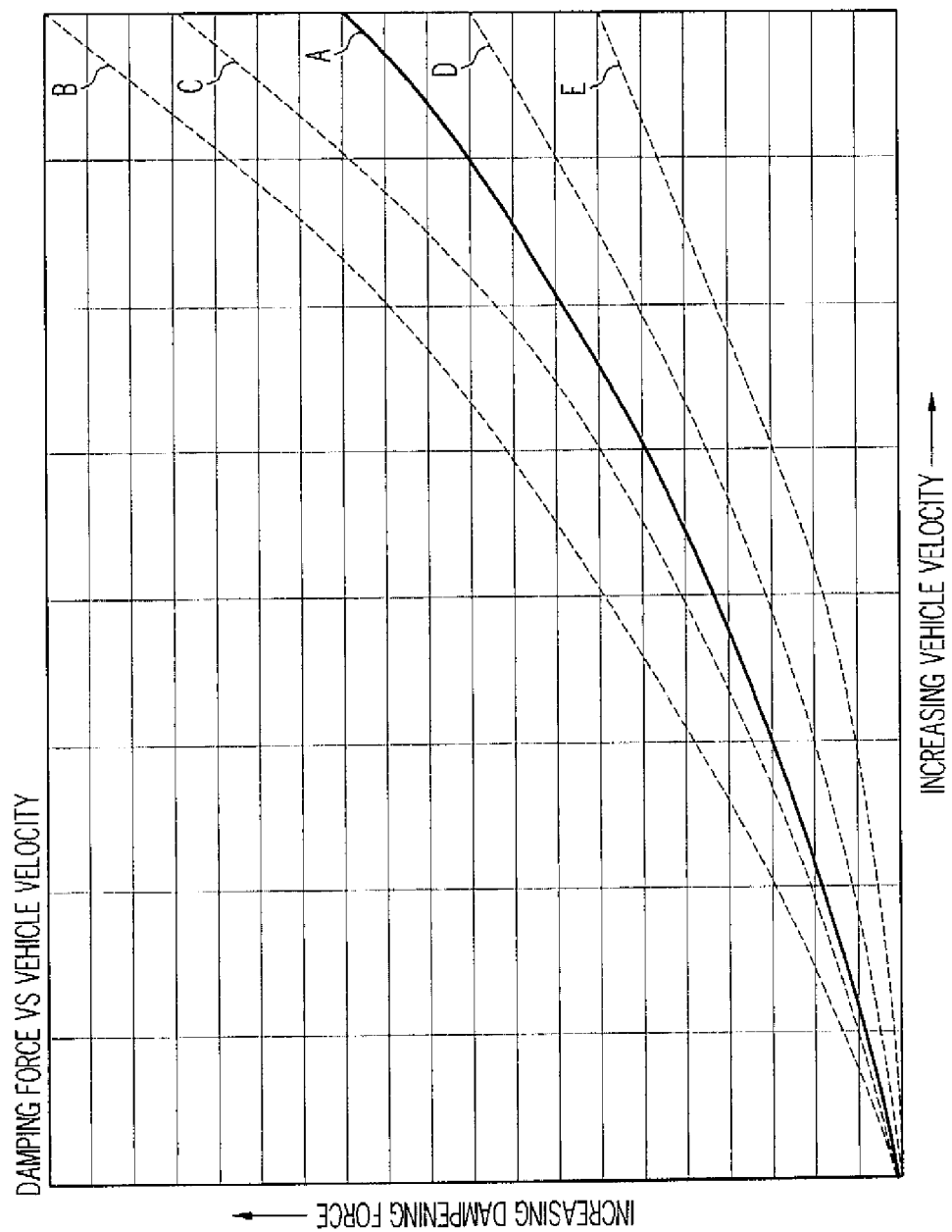
FIG. 7 is a chart depicting multiple dampening maps in accordance with one embodiment, wherein each of the dampening maps associates a range of vehicle speeds with particular dampening forces.

In one embodiment, as shown in FIGS. 3-5, a memory device 48 can be attached to the ECU 46. The memory device 48 can be configured to store dampening maps. A dampening map associates a range of vehicle conditions with particular dampening forces. In one embodiment, a dampening map may associate dampening forces with a range of vehicle speeds. For example, FIG. 7 depicts five respective dampening maps A, B, C, D, and E which can be simultaneously stored within the memory device 48. In other embodiments, it will be appreciated that a different quantity of dampening maps might be stored within the memory device 48. In such an embodiment, the range of vehicle speeds may be associated with dampening forces such that dampening forces applied by an electronic steering damper system increase as the speed of a vehicle increases. It will be appreciated that dampening maps can be predefined by an operator or a vehicle's manufacturer, and/or might alternatively change dynamically as a function of a predefined algorithm.

Through use of the actuator 60, an operator can select from among the dampening maps stored in the memory device 48. In response to this selection, by varying the action of the valve 42, the electronic steering damper system 22 can apply a dampening force to a steering interface 14 in accordance with the selected dampening map. For example, the actuator 60 might comprise a rotatable knob which is movable between five respective positions which correspond with the dampening maps A, B, C, D, and E stored within the memory device 48. An operator may rotate the knob to select from among the dampening maps. The knob might comprise markings to indicate to an operator which of the dampening maps has been selected. In another embodiment, an indicator, such as one or more indicator lights or display screens, can be attached to the ECU 46 and can be configured to display indicia to an operator which corresponds with and identifies which dampening map has been selected by the operator through use of the actuator.

By selecting from among multiple dampening maps, an operator can adjust the manner in which the electronic steering damper system 22 applies a dampening force to a steering interface 14 in response to detected vehicle conditions. In this manner, an operator may select a dampening map that suits his or her skill level, anticipated terrain, or desired ride attributes. For example, an experienced operator may wish to quickly turn the ATV at high speeds (e.g., when steering the ATV through an obstacle course). Consequently, that operator may select a dampening map which applies relatively low dampening force at high vehicle speeds (e.g., dampening map E illustrated in FIG. 1). In another example, an inexperienced operator may wish to have movements of a steering interface significantly dampened at high speeds. Consequently, the operator may select a dampening map which applies relatively high dampening forces at high vehicle speeds (e.g., dampening map B illustrated in FIG. 1). It will also be appreciated that an operator may select from among the dampening maps during use and/or motion of the ATV such that the operator need not stop the ATV to select a different dampening map. The electronic steering damper system 22 can therefore be configured to selectively impose resistance to steering of wheels (e.g., 20) of the ATV 10 in accordance with a selected one of the preset dampening maps and in real time response to the vehicle condition signal. By facilitating selection by an operator from among a plurality of predefined dampening maps, it will be appreciated that the electronic steering damper system 22, through only a single action by an operator (e.g., turning a knob to a desired setting), can simultaneously establish what amount of dampening will be applied to a steering interface across an entire range of vehicle operating conditions (e.g., ground speeds).

An electronic steering damper system may be provided in any of a variety of alternative configurations to generate a control signal in response (e.g., real time response) to a speed signal and an actuator signal. Some of these alternative configurations might not involve a memory device associated with an ECU, and might therefore not include any provision for storage of predefined dampening maps. Rather, in such circumstance, the actuator might be configured to facilitate a bias, gain, or other algorithmic attribute affecting the amount of dampening exerted upon a steering interface by an electronic steering damper system in response to one or more sensed vehicle conditions.

Although the electronic steering damper system has been described above to include hydraulic or pneumatic damper components, it will be appreciated that an electronic steering system might additionally or alternatively include any of a variety of other types of components which might be configured for selectively dampening a steering interface. For example, an electronic steering damper system may comprise a friction-type steering damper system which includes one or more clutch plates and/or brake discs for frictionally resisting movement of a steering interface. In another example, an electronic steering damper system might employ electromagnets to inductively resist movement of a steering interface.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A saddle-type vehicle comprising:
   a frame;
   a vehicle condition sensor supported with respect to the frame and configured to generate a vehicle condition signal;
   at least one wheel supported with respect to the frame and configured for contacting the ground during travel of the saddle-type vehicle;
   a steering interface comprising a handlebar supported with respect to the frame, wherein the handlebar is operably coupled with said wheel and is configured to facilitate steering of said wheel by an operator;
   an electronic steering damper system supported with respect to the frame and comprising a memory device configured to store multiple respective preset dampening maps; and
   an actuator comprising an electrical switch connected to the electronic steering damper system, wherein the actuator is configured for use by an operator to select from among the preset dampening maps;
   wherein the electronic steering damper system is configured to selectively impose resistance to steering of said wheel in accordance with a selected one of the preset dampening maps and in real time response to the vehicle condition signal.

2. The saddle-type vehicle of claim 1 wherein the electronic steering damper system comprises a solenoid valve.

3. The saddle-type vehicle of claim 1 wherein the actuator is attached to the handlebar.

4. The saddle-type vehicle of claim 1 wherein the vehicle condition sensor comprises a speed sensor configured to generate the vehicle condition signal reflecting at least one of a ground speed of the saddle-type vehicle, an engine speed of the saddle-type vehicle, and a steering shaft speed of the saddle-type vehicle.

5. The saddle-type vehicle of claim 1 wherein the actuator is configured for use by an operator during movement of the saddle-type vehicle to select from among the preset dampening maps.

6. The saddle-type vehicle of claim 1 comprising an all terrain vehicle.

7. A vehicle comprising:
   a frame;
   a vehicle condition sensor supported with respect to the frame and configured to generate a vehicle condition signal;
   at least one wheel supported with respect to the frame and configured for contacting the ground during travel of the vehicle;
   a steering interface supported with respect to the frame, wherein the steering interface is operably coupled with said wheel and is configured to facilitate steering of said wheel by an operator;
   an electronic steering damper system supported with respect to the frame and configured to selectively impose resistance to steering of said wheel in response to the vehicle condition signal; and
   an actuator connected with the electronic steering damper system and configured for use by an operator to adjust the manner in which the electronic steering damper system selectively imposes resistance to steering of said wheel in response to the vehicle condition signal;

wherein the electronic steering damper system comprises a memory device configured to store multiple respective preset dampening maps, the electronic steering damper system is configured to facilitate selection by an operator from among the preset dampening maps through use of the actuator, and the electronic steering damper system is configured to selectively impose resistance to steering of said wheel in response to the vehicle condition signal and a selected one of the preset dampening maps.

8. The vehicle of claim 7 comprising a saddle-type vehicle.

9. The vehicle of claim 7 wherein the actuator comprises an electrical switch.

10. The vehicle of claim 7 wherein the electronic steering damper system comprises a solenoid valve.

11. The vehicle of claim 7 wherein the actuator is configured for use by an operator, during movement of the vehicle, to adjust the manner in which the electronic steering damper system selectively imposes resistance to steering of said wheel in response to the vehicle condition signal.

12. The vehicle of claim 7 wherein the actuator is configured such that an operator may, during movement of the vehicle, use the actuator to select from among the preset dampening maps.

13. The vehicle of claim 7 wherein the steering interface comprises a handlebar, and wherein the actuator is attached to the handlebar.

14. The vehicle of claim 7 wherein the vehicle condition sensor comprises a speed sensor configured to generate the vehicle condition signal reflecting at least one of a ground speed of the vehicle, an engine speed of the vehicle, and a steering shaft speed of the vehicle.

15. An electronic steering damper system for a vehicle, the electronic steering damper system comprising:
   a conduit configured for passage of fluid;
   a solenoid valve associated with the conduit and configured to selectively regulate flow within the conduit in response to a control signal;
   a first input configured to receive a speed signal from a speed sensor;
   a second input configured to receive an actuator signal from an actuator;
   a controller connected with the solenoid valve, the first input, and the second input, the controller being configured to generate the control signal in real time response to the speed signal and the actuator signal; and
   a memory device connected with the controller and configured to store multiple respective preset dampening maps, wherein the controller is configured to select from among the preset dampening maps in response to the actuator signal, and wherein the controller is configured to generate the control signal in response to the speed signal, the actuator signal, and a selected one of the preset dampening maps.

16. The electronic steering damper system of claim 15 wherein the solenoid valve comprises a linear solenoid valve.

17. The electronic steering damper system of claim 15 wherein the solenoid valve comprises a rotary solenoid valve.

* * * * *